(12) United States Patent
Gilman

(10) Patent No.: X9560
(45) Date of Patent: Mar. 31, 1836

(54) OINTMENT FOR CANCER

(76) Inventor: Elias Gilman

Elias Gilman

The Schedule referred to in these Letters Patent, and making part of the same, containing a description in the words of the said Elias Gilman himself of his improvement in "an ointment for the cure of Cancer."

---

To all to whom these presents shall come: Be it known that I, Elias Gilman in the County of Licking, and State of Ohio have invented a new and useful improvement, viz an ointment for the cure of the cancer and that the following is a full and exact description of the composition as invented by me. Take of sulphate of iron finely pulverized and mutton tallow equal parts, mix by thoroughly grinding or working them together so as to form an ointment or plaister. Method of using - Spread a necessary portion of the ointment on a piece of linen; and renew it as necessity may require - the cancer to be washed clean every time the plaister is renewed; alternately with a decoction of Spikenard and tanners ooze - and apply a small quantity of strong decoction of yellow oak bark, every time a plaister is put on. Also a solution of one part potash, and four parts water, may be used as necessity may require.

Witnesses
A. P. Prichard
Wm B. Pratt

Elias Gilman